United States Patent [19]

Nurmohamed et al.

[11] 3,725,818

[45] Apr. 3, 1973

[54] VOTER CIRCUITS FOR THREE-CHANNEL REDUNDANT SYSTEMS

[75] Inventors: Amin Mulji Nurmohamed, Gillingham; Richard Watters, Penshurst, near Tonbridge, both of England

[73] Assignee: Elliott Brothers ( London) Limited, London, England

[22] Filed: Sept. 15, 1971

[21] Appl. No.: 180,632

[52] U.S. Cl. ............330/124 D, 328/152, 330/124 R

[51] Int. Cl. ............H03f 3/68

[58] Field of Search............330/30 R, 124 R, 124 D; 307/204, 219; 328/103, 152

[56] References Cited

UNITED STATES PATENTS

| | | | |
|---|---|---|---|
| 3,054,039 | 9/1962 | Meredida | 330/124 D X |
| 3,631,352 | 12/1971 | Kelley et al. | 307/204 X |

*Primary Examiner*—Roy Lake
*Assistant Examiner*—James B. Mullins
*Attorney*—Morris Kirschstein et al.

[57] ABSTRACT

This invention relates to voter circuits for three-channel redundant systems, "synchronizing" the signals in the channels. The channel 2 signal is normally fed straight through, and is compared with the signals in channels 1 and 3 by limited authority amplifiers A1 and A2 whose outputs are added into channels 1 and 3 to bring those channel outputs into near equality with channel 2. Faults are detected by a fault detector 16, which detects when any one channel input differs by more than a preset small amount from the other two channels. For channel 1 or channel 3 faults, the input for that channel is switched to channel 2 or channel 1 respectively. For channel 2 faults, the input for that channel is switched to channel 3; additionally, a fader circuit 20 is switched in. This stores the difference between channels 2 and 3 just before the fault, adds it to the outputs, and gradually fades out this difference until the outputs are following channel 3 instead of channel 2. Transients in the outputs following a fault are thus eliminated without affecting the frequency response of the system to changes in the inputs.

5 Claims, 8 Drawing Figures

VOTER CIRCUITS FOR THREE-CHANNEL REDUNDANT SYSTEMS

Figure 1:
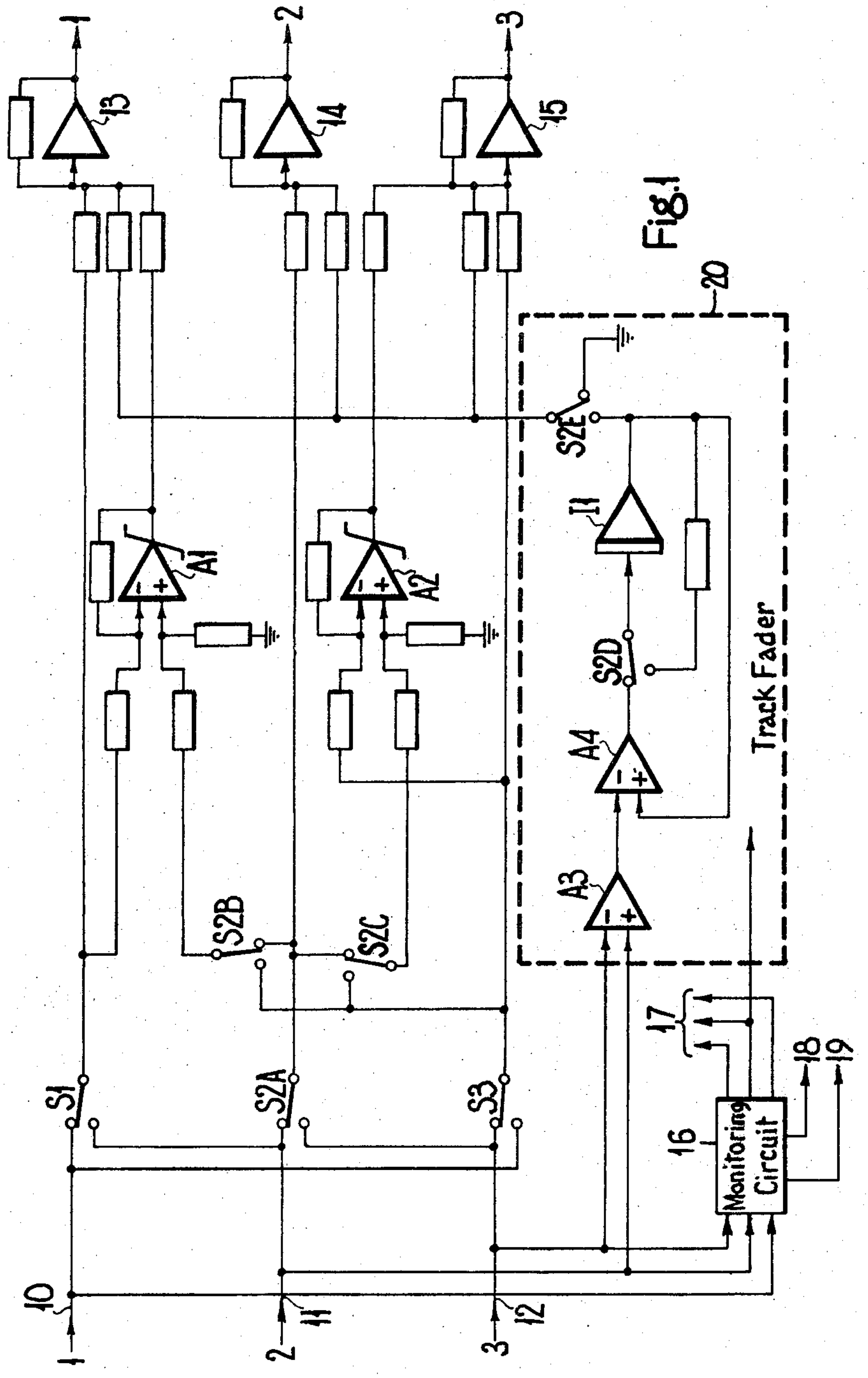

The present invention relates to voter circuits for three-channel redundant systems, and "synchronizes" the signals in the channels.

In control systems of high reliability, it is common to provide three identical channels in parallel for processing data, with voter circuits provided at intervals along the channels. Each voter circuit monitors the three channels to determine whether or not the signals in the three channels are substantially equal. If the signals are substantially equal or differ by less than a predetermined level, they are "synchronized" and are allowed to pass forward to the next sections of the channels; but if they differ, then the one which differs substantially from the other two is blocked, and the other two are used to feed all three channels from that point via channel interconnection circuitry. Thus any failure of any one of the channels between two voter circuits is detected by the second voter circuit, since the output of the failed channel will differ from the substantially identical outputs of the other two channels; and corrected, by being blocked, with the other two channels feeding all three channels beyond the second voter circuit.

It is essential for any voting or synchronizing circuit to "absorb" normal differences between the signals in the three channels, so that its outputs differ by less than its inputs when no failure has occurred. This prevents normal differences between the channels from accumulating and eventually simulating an error. It is very desirable for the synchronizing circuitry not to introduce any appreciable transient signals when an error does occur and one of the outputs has to be blocked by switching occurring in the channel interconnection circuitry in order to generate the three outputs from the two remaining correct inputs.

The object of the present invention is to provide improved signal synchronizing and channel connection circuitry.

According to the invention, a voter circuit for a triple redundant system having three inputs and three outputs, the voter circuit comprising circuitry, between the inputs and outputs, which maintains all three outputs equal at a value which is a predetermined function of three input signals applied concurrently to the three inputs regardless of whether all three input signals are essentially equal in value or one only of the three input signals exceeds a prescribed threshold relative to the other two, e.g. as a result of a runaway failure at any one input.

In a first embodiment of the invention, one channel (channel 2) is arbitrarily chosen as a "primary" channel, and under normal conditions all three outputs of the channel interconnection circuitry are synchronized to the primary channel input. Thus any failure of channels 1 or 3 has no effect on the outputs; only channel 2 input failures affect the output signals. Further, on channel 2 failure, one of the remaining channels (channel 3) is arbitrarily chosen as the back-up channel, and all three outputs of the channel interconnection circuitry are caused to follow this channel in the event of a failure in channel 2. Thus transients can only arise from switching from channel 2, the primary channel, to channel 3, the back-up channel. A limited authority fader circuit is provided, fed from channels 2 and 3, and this is switched on and its output injected into the synchronizing circuitry following a channel 2 failure. This fader circuit is constructed to generate an initial step equal and opposite to the difference between the signals in channels 2 and 3 at the instant prior to failure, and to gradually fade out this difference by a decay circuit. The signals in channel 2 (before failure) and channel 3 (after failure) do not themselves pass through the fader circuit — only the difference between them drives the fader circuit. The outputs of the channel interconnection circuitry will therefore respond immediately to any change in the two remaining unaffected channel inputs. The fader circuit may be triplicated, each of the three units feeding only one output amplifier.

In a second embodiment the average of the inputs on channels 1 and 3 is chosen as a reference value and under normal conditions all three outputs of the channel interconnection circuitry are synchronized to the primary value. Thus any failure of channel 2 has no effect on the outputs; only channels 1 or 3 input failures affect the output signals. Further, on a channel 1 or 3 failure channel 2 is employed as the back-up primary channel and all three outputs of the channel interconnection circuitry are caused to follow this channel in the event of a failure in channel 1 or 3. Thus transients can only arise from switching from the average of the channel 1 and 3, the primary channels, to channel 2, the back-up primary channel. A limited authority fader circuit is provided, fed with channel 2 and the average of the signals on channels 1 and 3 and this is switched on and its output injected into the synchronizing circuitry following a failure of channel 1 or 3. This fader circuit is constructed to generate an initial step equal and opposite to the difference between the signals in channel 2 and the average of channels 1 and 3 at the instant prior to failure, and to gradually fade out this difference by a decay circuit. The average of signals in channels 1 and 3 (before failure) and channel 2 (after failure) do not themselves pass through the fader circuit — only the difference between them drives the fader circuit. The outputs of the channel interconnection circuitry will therefore respond immediately to any change in the two remaining unaffected channel inputs. The fader circuit may be triplicated, each of the three units feeding only one output amplifier.

The monitoring circuit of both embodiments therefore consists of two parts. One part is the error detection circuitry. This may consist for example of three amplitude comparators each fed from a respective pair of channels and producing a digital output signal when the inputs differ by more than a predetermined amount. The outputs of the three comparators will be combined in logic circuitry which produces three error outputs, corresponding to failures in the three channels, and two failure outputs, a first failure output indicating a single channel failure and a second failure output indicating two channel failures. The failure outputs are used for servicing and failure indication, while the error outputs are fed to the second part of the monitoring circuit. This second part is the channel connection circuitry and is essentially switching circuitry which connects the three inputs to the synchronizing circuit in a manner which "absorbs" input failures.

Figure 2A:
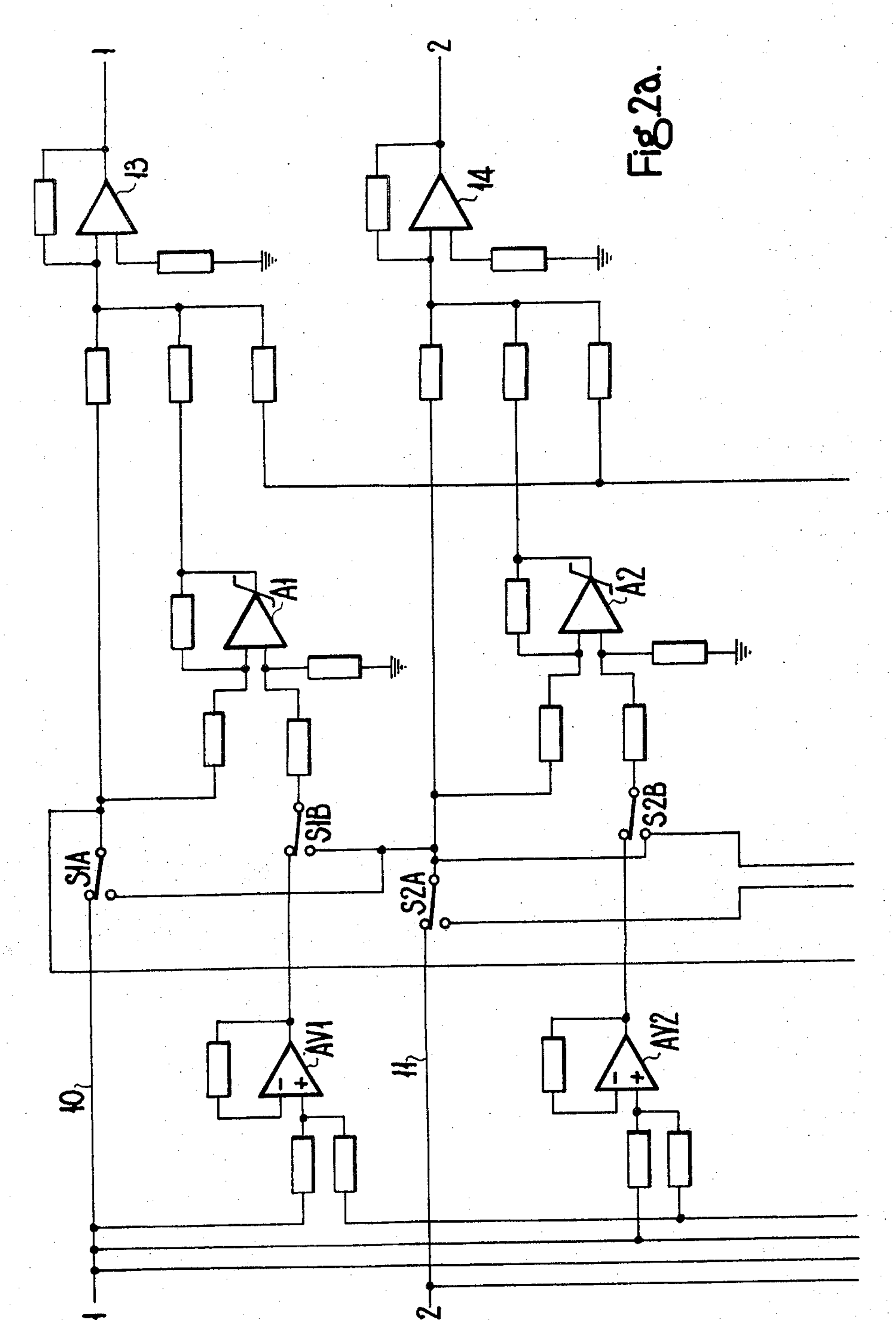
Figures 2B, 3:
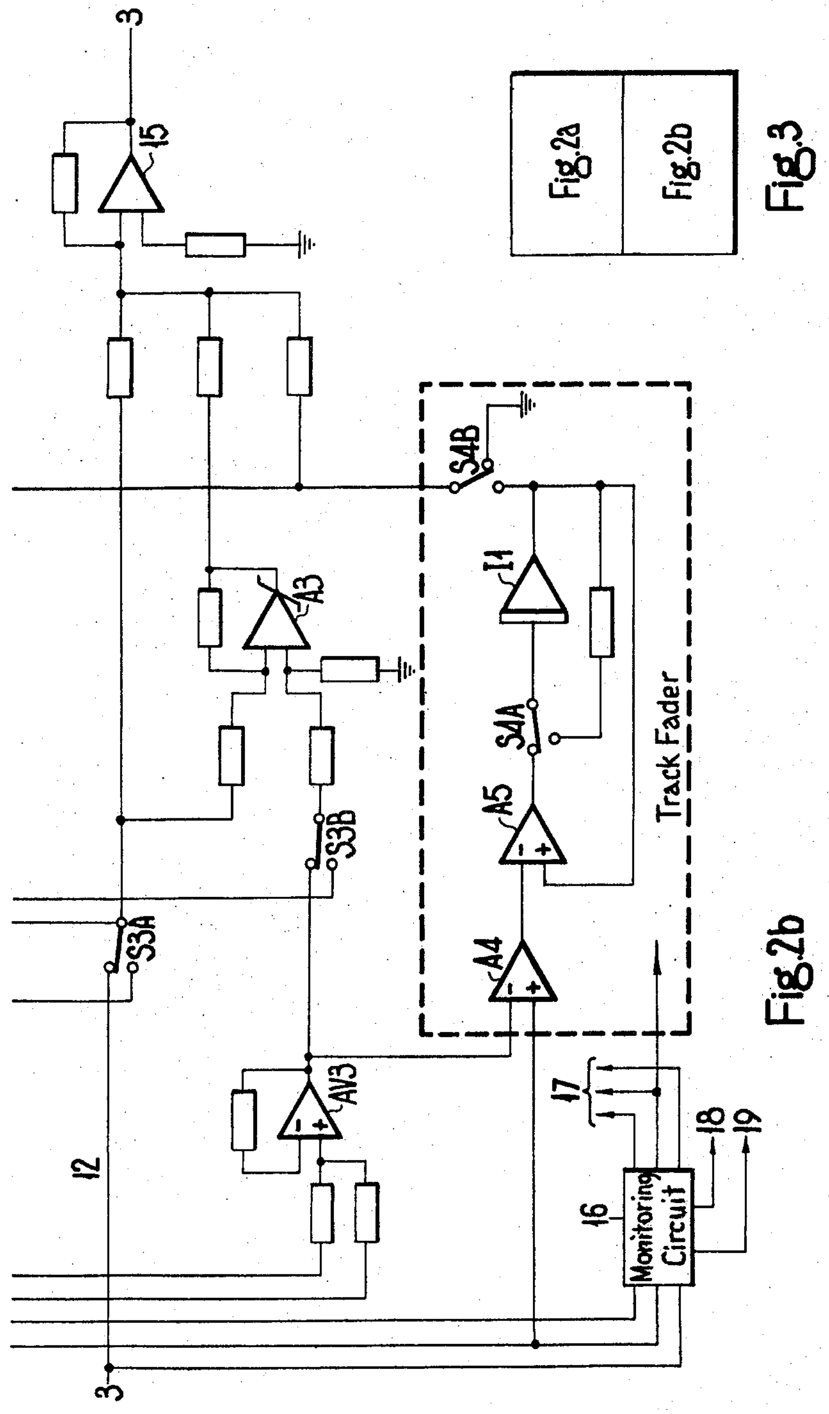
Figure 4:
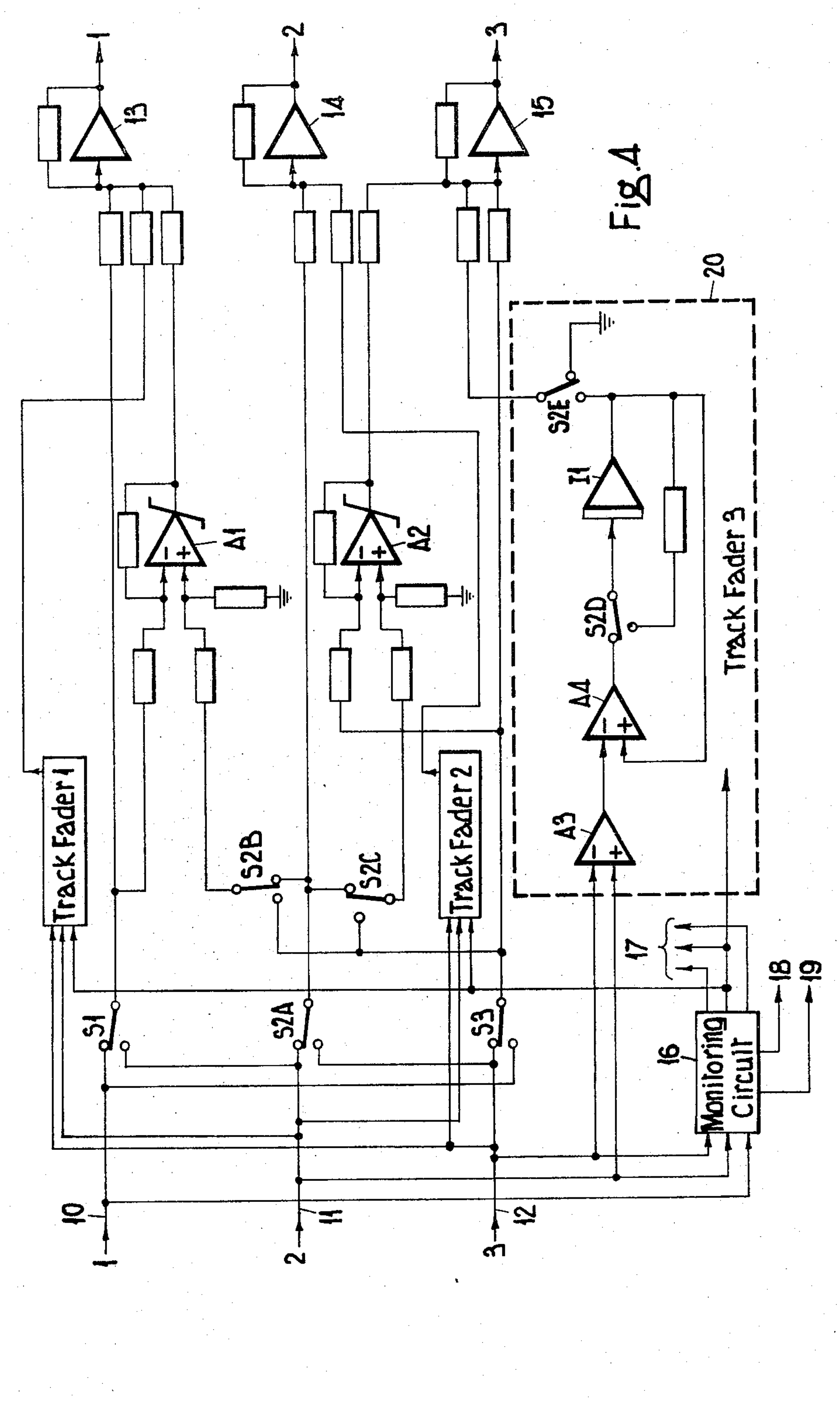
Figure 5A:
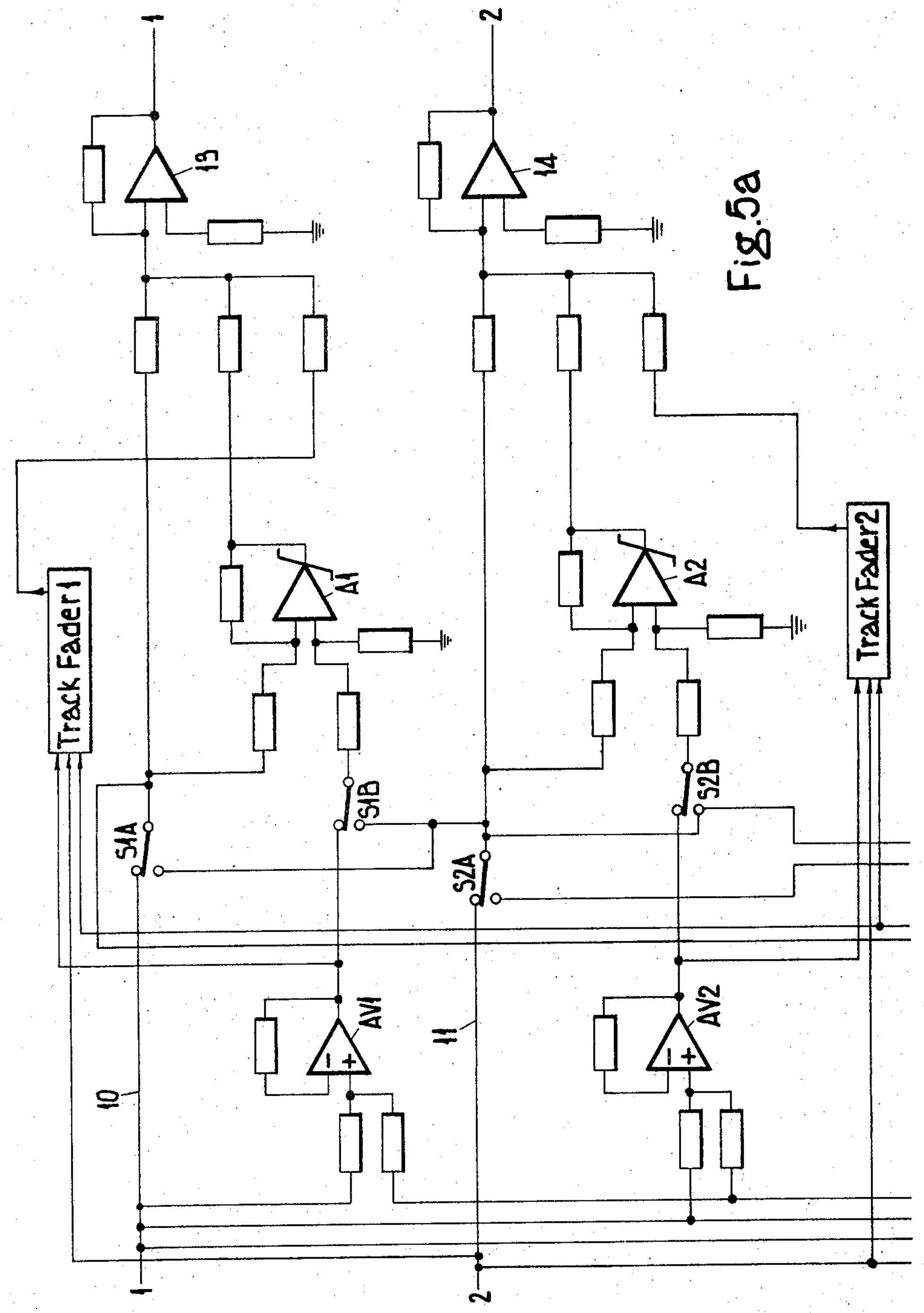
Figures 5B, 6:
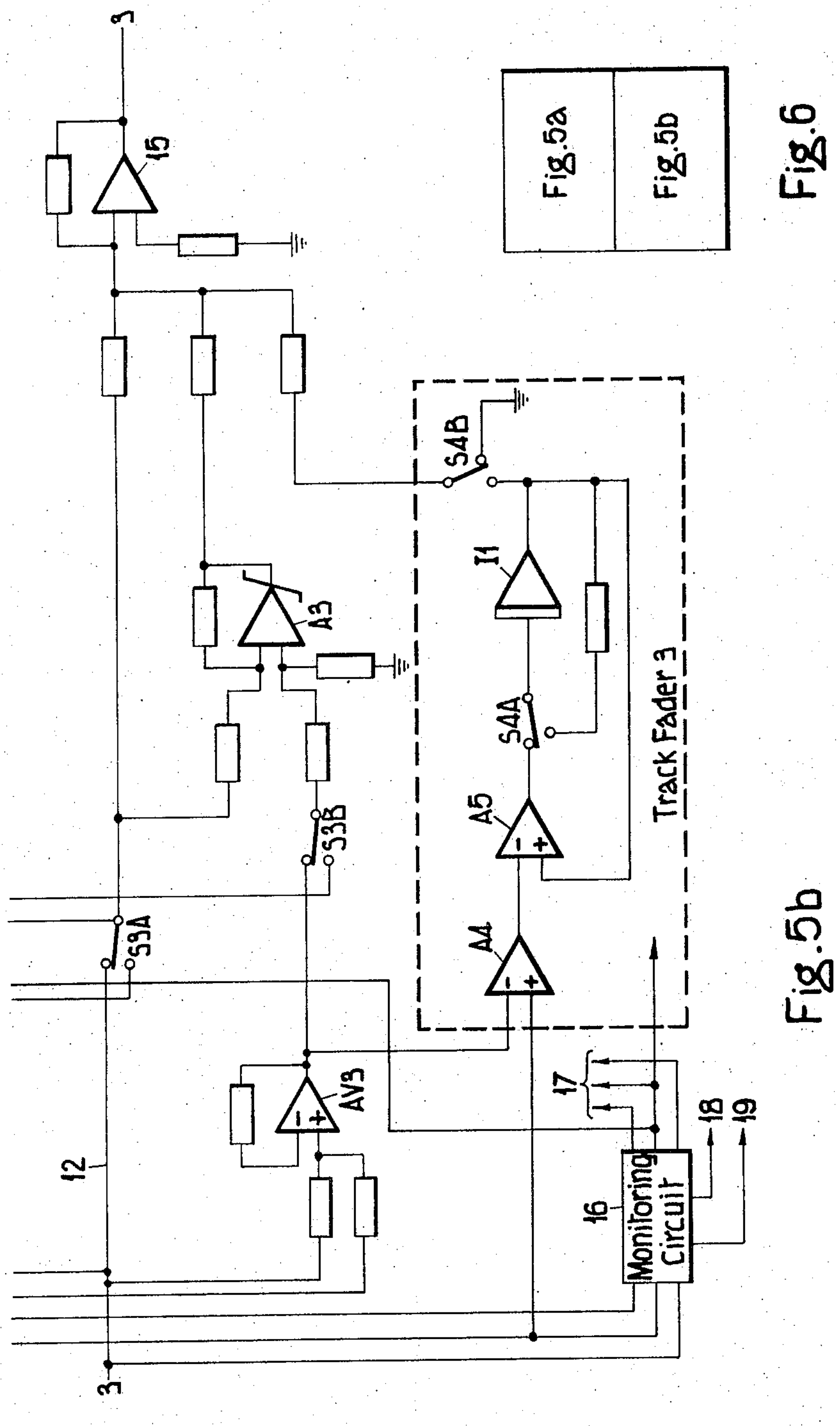

Two exemplary embodiments of the invention will now be described with reference to the accompanying drawings in which:

FIG. 1 is a diagram, partly in circuit form and partly in block form, of a first embodiment of a voter circuit;

FIGS. 2A and 2B form a similar diagram of a second embodiment;

FIG. 3 is a block diagram showing the connection between FIGS. 2A and 2B. FIG. 4 is a diagram of an alternative version of the embodiment of FIG. 1; FIGS. 5A and 5B form a diagram of an alternative version of the embodiment of FIGS. 2A and 2B; and FIG. 6 shows the connection between FIGS. 5A and 5B.

It will be realized that these embodiments are slightly simplified, by the omission of certain details and features which would be required to make the channel interconnection circuitry itself substantially immune to any single failure.

Referring to FIG. 1, the channel interconnection circuitry is shown in circuit form. The three channels supply input signals on lines 10 to 12, and the circuitry generates three output signals from amplifiers 13 to 15 which feed the next sections of the three channels. The inputs on lines 10 to 12 are fed to the error detection circuitry 16, shown as a block. This generates error signals on three output lines 17, corresponding to the three channels, a channel failure causing energization of the corresponding one of lines 17. The error detection circuitry 16 also generates a first failure signal on line 18 when a signal channel failure is detected, and a second failure signal on line 19 when two channel failures are detected.

In normal operation, i.e. with no channel failure, all switches are in the positions shown. The fader circuit 20 has zero output, since switch S2E is earthed. Channel 2 output, amplifier 14, is therefore driven direct from channel 2 input, line 11, via switch S2A. Channels 1 and 3 similarly have their outputs driven from their respective inputs. However, the difference between channels 1 and 2 is detected and inverted by amplifier A1, which has limited authority so that a failure of this amplifier does not cause a disruption of more than one output. This amplifier A1 drives the channel 1 output amplifier 13, in addition to the direct drive from channel 1 input. The output of amplifier 13 is therefore the sum of channel 1 input and the difference between channel 1 and channel 2 inputs, and is therefore equal to the channel 2 input. Similarly, amplifier A2 (which also has limited authority) inverts the difference between channel 2 and channel 3 inputs, and drives channel 3 output amplifier 15. The outputs of all three amplifiers 13 to 15 therefore follow the channel 2 input.

In the event of a failure in channels 1 or 3, the corresponding one of the lines 17 will be energized. This will change over the position of switch S1 or S3 as the case may be. Change over of switch S1 results in output amplifier 13 being driven directly from channel 2 input; change over of switch S3 results in channel 1 driving both output amplifiers 13 and 15 and the difference between channels 1 and 2 being subtracted from both. Thus either of these failures leaves the output signals substantially unchanged.

In the event of a failure in channel 2, the corresponding one of lines 17 will be energized, and switches S2A, S2B, and S2C changed over. This results in channel 3 input driving the three outputs, instead of channel 2 input. Additionally, switch S2D opens and switch S2E changes over in the fader circuit 20. In this fader circuit, amplifier A3 forms the difference between the signals in channels 2 and 3. Before failure, this difference is fed to integrator I1 over amplifier A4 and switch S2D, which is closed at that time, so that integrator I1 stores the difference between the channel 2 and channel 3 signals. The time constant of integrator I1 is made small enough to allow tracking of normal low frequency errors between channels 2 and 3, but large enough to prevent immediate storage of step function differences which may occur before a channel 2 failure is detected. On a channel 2 failure, switch S2D is opened, isolating the stored quantity on integrator I1 from changes due to the failure of channel 2; and switch S2E is closed, applying the stored quantity to the three output amplifiers 13 to 15. This drives the output amplifiers with the difference between the channel 2 and channel 3 signals, and thus holds the outputs at the channel 2 value before failure. The integrator I1 will, however, gradually lose its stored value, so the outputs will decay to the channel 3 level with the fader circuit time constant. At the same time, the outputs will immediately follow any changes in the channel 3 input occurring after the channel 2 failure has been detected. Instead of a single, track/fader circuit serving all three channels, each channel may have its own track/fader circuit as shown in FIG. 5. All three track/fader circuits are identical and as described above.

Referring to FIG. 2, the three channels again supply input signals on lines 10 to 12, and the circuitry generates three output signals from amplifiers 13 to 15 which feed the next sections of the three channels. The inputs on lines 10 to 12 are also, however, fed to averaging amplifiers AV1, AV2 and AV3. These amplifiers provide outputs which are equal to the average of channel 1 and 3 inputs. These outputs are used for synchronizing the channels. The inputs on lines 10 to 12 are fed to the error detection circuitry 16, shown as a block. This generates error signals on three output lines 17, corresponding to the three channels, a channel failure causing energization of the corresponding one of lines 17. The error detection circuitry 16 also generates a first failure signal on line 18 when a signal channel failure is detected, and a second failure signal on line 19 when two channel failures are detected.

In normal operation, i.e. with no channel failure, all switches are in the positions shown. The fader circuit 20 has zero output, since switch S4B is earthed. Channel 2 output, amplifier 14, is therefore driven direct fro channel 2 input, line 11, via switch S2A. Channels 1 and 3 similarly have their outputs driven from their respective inputs. However, the difference between channel 1 and the average of channel 1 and 3 is detected and inverted by amplifier A1, which has limited authority so that a failure of this amplifier does not cause a disruption of more than one output. This amplifier A1 drives the channel 1 output amplifier 13, in addition to the direct drive from channel 1 input. The output of amplifier 13 is therefore the algebraic sum of channel 1 input and the difference between channel 1 and the average of channel 1 and 3 inputs, and is therefore equal to the average of channel 1 and 3 inputs.

Similarly, amplifiers A2 and A3 (which also have limited authority) respectively invert the difference between channels 2 and 3 and the average of channels 1 and 3 inputs, and drive channel 2 and 3 output amplifiers 14 and 15. The outputs of all three amplifiers 13 to 15 therefore follow the average of channel 1 and 3 inputs.

In the event of a failure in channel 2, the corresponding one of the lines 17 will be energized. This will change over the position of switch S2A. Change over of switch S2A results in output amplifier 14 being driven directly from channel 3 input and the difference between channel 3 and the average of channels 1 and 3 being subtracted leaves the output signal substantially unchanged.

In the event of a failure in channel 1 or 3 the corresponding lines 17 will be energized, and switches S1B, S2B, and S3B plus either S1A or S3A as the case may be will change over. This results in channel 2 input driving the three outputs, instead of the average of channels 1 and 3 inputs. Additionally, switch S4A opens and switch S4B changes over in the fader circuit 20. In this fader circuit, amplifier A4 forms the difference between the signals in channel 2 and the average of channels 1 and 3. Before failure, this difference is fed to integrator I1 over amplifier A5 and switch S4A, which is closed at that time, so that integrator I1 stores the difference between the channel 2 and the average of channels 1 and 3 signals. The time constant of integrator I1 is made small enough to allow tracking of normal low frequency errors between channel 2 and the average of channels 1 and 3 but large enough to prevent immediate storage of step function differences which may occur before channels 1 or 3 failures are detected. On a failure of channel 1 or 3, switch S4A is opened, isolating the stored quantity on integrator I1 from changes due to the failure of channels 1 or 3; and switch S4B is closed, applying the stored quantity to the three output amplifiers 13 to 15. This drives the output amplifiers with the difference between the channel 2 and the average of channels 1 and 3 signals, and thus holds the outputs at the average of channels 1 and 3 value before failure. The integrator I1 will, however, gradually lose its stored value, so the outputs will decay to the channel 2 input level with the fader circuit time constant. At the same time, the outputs will immediately follow any changes in the channel 2 input occurring after the channel 1 or 3 failure has been detected. As shown in FIGS. 5A, 5B, and 6, each channel may be provided with a separate track/fader circuit.

One advantage of this arrangement over those without some form of transient suppression is that larger operational disparities between the inputs can be tolerated without generating the output transients which are normally caused by any blocking of the failed input. The tolerances on the channels themselves can therefore be increased, and the chance of marginal failure (i.e. failure due to the characteristics of a channel input going slightly beyond the permitted limits) are substantially reduced.

We claim:

1. A voter circuit for a triple redundant system having three inputs and three outputs comprising monitoring circuitry for receiving signals from all three inputs and for producing an output signal in the event of failure of at least one of the inputs, synchronizing circuitry for receiving signals from all three inputs and operable by the output of the monitoring circuit to maintain all three outputs equal at a value which is a predetermined function of the three input signals and track/fader circuitry for receiving two of said inputs so as under normal operation to continuously track the disparity between said two inputs and for receiving an output from said monitoring circuitry, said monitoring circuit output acting to cause the track/fader circuitry to change from a track configuration to a fade configuration to produce an output voltage which decays slowly to zero with a relatively long time constant, said output voltage being connected to the synchronizing circuitry so that the outputs of the synchronizing circuitry do not exhibit step changes following an input failure.

2. A circuit according to claim 6 in which: the synchronizing circuitry has three channels which extend between respective ones of the three inputs and respective ones of three output summing amplifiers; an error amplifier has its inputs connected between one pair of channels, and another error amplifier has its inputs connected between another pair of channels, one of the channels, hereinafter called the "master" channel, being common to both error amplifiers, and the outputs of the error amplifiers are respectively connected to the output summing amplifier of the other two channels, hereinafter called the "slave channels", in order to remove the error between inputs associated with the slave channel and the input associated with the master channel; associated switching circuitry is controlled by the monitoring circuitry so as, when any one input signal exceeds the other two by more than a prescribed threshold, to disconnect the said any one input and to connect a predetermined one of the remaining inputs to the error and summing output amplifiers to which the "failed" input was previously connected; the track/fader circuitry has inputs which, in the absence of an input failure, are connected to the master and a predetermined one of the slave channels, which predetermined slave channel is utilized as the synchronizing reference for the error amplifiers following failure of the input to the master channel; and in which following failure of the master input the track/fader circuitry is switched by the monitoring circuitry to the fade configuration and connected to the output summing amplifiers in order to eliminate the step change which would otherwise occur at each of the three outputs.

3. A circuit according to claim 2 in which the track/fader circuitry comprises three substantially identical track/fader circuits respectively associated with the three channels.

4. A system according to claim 1 in which: the synchronizing circuitry has three channels which extend between respective ones of three output summing amplifiers; there are three averaging amplifiers whose inputs are connected to the same two system inputs and the outputs of which are respectively connected to three error amplifiers, which error amplifiers are also connected to different ones of the three channels, and the outputs of the error amplifiers are connected to different ones of the three output summing amplifiers; the error amplifiers effectively synchronize each input to the value of the average of the said two system inputs; associated switching circuitry is controlled by the monitoring circuitry so as, when any one input exceeds the other two by more than a prescribed threshold, to disconnect the said any one input and also the connections between the averaging amplifiers and the error amplifiers in the case of a failure of the said two system inputs and to connect a predetermined one of the remaining inputs to the error and summing output amplifiers to which the "failed" input was previously connected and also to connect the other system input to the error amplifiers in place of the connections from the averaging amplifiers, in the case of a failure of either of the said two system inputs; and the track/fader circuitry has inputs which are normally, i.e. in the absence of an input failure, connected to the averaging amplifiers and the said other system input which is utilized as the synchronizing reference for the error amplifiers, and following failure of one of the said two system inputs the track/fader circuitry is switched by the monitoring circuitry from its track to its fade configuration connected to the output summing amplifiers in order to eliminate the step change which would otherwise occur at each of the three outputs.

5. A system according to claim 4 in which the track/fader circuitry comprises three substantially identical track/fader circuits respectively associated with the three channels.

* * * * *